United States Patent [19]

Bloem et al.

[11] Patent Number: 5,564,047
[45] Date of Patent: Oct. 8, 1996

[54] TRIGGER GENERATION IN AN ACTIVE DATABASE MANAGEMENT SYSTEM

[75] Inventors: Wouter Bloem, Hilversum; Wiel A. G. Bruls, Utrecht, both of Netherlands

[73] Assignee: International Business Machines Corporation, Armonk, N.Y.

[21] Appl. No.: 420,185

[22] Filed: Apr. 11, 1995

[51] Int. Cl.⁶ .................................................. G06F 17/30
[52] U.S. Cl. .................................. 395/600; 364/DIG. 1; 364/282.1
[58] Field of Search ........................... 395/600, 50, 51, 395/52, 54, 934

[56] References Cited

U.S. PATENT DOCUMENTS 5,471,629  11/1995  Risch ....................................... 395/800

OTHER PUBLICATIONS

"Improving the Software Process with Active Repositories" by H. Jasper, Universitat Oldenburg, FB Informatik, Oldenburg, Germany–pp. 379–390.
"Active Object–Oriented Database Design Using Active Object/Behavior Diagrams" by P. Bichler et al, 1994 IEEE Workshop, pp. 163–171.
"A Framework for Handling Errors . . . Object–Oriented DBMS" by H. Wang et al –1994 IEEE Workshop–pp. 132–136.
"Making a Federated System Active" by J. M. Blanco et al, Proc. of Dexa '92 Int. Conf.–Sep. 2–4, 1992, pp. 345–350.
"Design of Sentinel: An object–oriented DBMS with event–based rules" by S. Chakravarthy et al, Information and Software Technology Issue vol. 36, No. 9 pp. 555–568, 1994.
"Integrating Active And Deductive Rules" by J. Harrison et al, Proc. of 1st Int. Workshop, Aug./Sep. 1993 –pp. 288–305.
"Deriving Active Rules . . . Object–oriented Database" by O. Diaz –Proc of Dexa '92 Int'l Conf. Sep. 2–4, 1992, pp. 332–337.

"A Model for Active Object Oriented Database" by C. Beeri et al –Proc. of the 17th Int'l Conf. Sep. 91 –pp. 337–349.
"Heterogeneous Object Model–View Relationships" by S. F. Griffin –IBM Technical Disclosure Bulletin–vol. 33, No. 6B, Nov. 1990 pp. 242–243.
Guy M. Lohman et al., "Extensions to Starburst—Objects, Types, Functions and Rules," Next–Generation Database Systems, Communications of the ACM, Oct. 1991, vol. 34 No. 10, pp. 94–109.
Opher Etzion, "The Reflective Approach for Data–Driven Rules," 1993 Int'l Conf. on Intelligent and Cooperative Information Systems, IEEE, pp. 350–358.
Stefano Ceri, "A Declarative Approach to Active Databases," 1992 8th Int'l Conf. on Data Engineering, IEEE, pp. 452–456.
Tore Risch, "Monitoring Database Objects," Proceedings of 15th Int'l Conf. on Very Large Data Bases, Aug. 1989, pp. 445–453.
C. B. Medeiros et al., "Object Integrity Using Rules," Proceedings of ECOOP '91, Jul. 1991, pp. 219–230.
Umeshwar Dayal et al. "Rules are Objects Too: A Knowledge Model for an Active, Object–Oriented Database System," 2d Int'l Workshop on Object–Oriented Database Systems, Sep. 1988, pp. 129–143.
D. R. McCarthy et al.,"The Architecture of an Active Database Management System," SIGMOD Record, vol. 18 No. 2, Jun. 1989, pp. 215–224.
U. Dayal et al., "Organizing Long –Running Activities with Triggers and Transactions," SIGMOD Record, vol. 19 No. 2, Jun. 1990, pp. 204–214.
N. Gelani et al., "Ode as an Active Database: Constraints and Triggers," Proceedings of 17th Int'l Conf. on Very Large Data Bases, Sep. 1991, pp. 327–336.
Oscar Diaz et al., "Rule Management in Object Oriented Databases: A Uniform Approach," Proceedings of 17th Int'l Conf. on Very Large Data Bases, Sep. 1991, pp. 317–326.
Angelika M. Kotz et al.,"Supporting Semantic Rules by a Generalized Event/Trigger Mechanism," Advances in Database Technology–EDBT ' 88, 1988, pp. 76–91.

Primary Examiner—Paul V. Kulik
Attorney, Agent, or Firm—William A. Kinnaman, Jr.

[57] ABSTRACT

Triggers for automatically starting an extract process in response to the committing of update data to a repository by

TYPE 1 TRIGGER
UPDATE PHASE an update process. In one embodiment, triggers are associated with particular extract processes and are started upon the committing of update data to the repository by an update process. Upon being started, each trigger determines whether any of the update data is within the extract view of the extract process that it is associated with and, if so, evaluates a predetermined condition specified for the trigger. If the condition is satisfied, the trigger translates the update data within the extract view into the extract view and starts the extract process. In another embodiment, triggers are bound to repository entities within the view of an extract process and are started upon the updating of the corresponding entities. Upon being started, each trigger evaluates a predetermined condition specified for entity post-image and, if the condition is satisfied, adds the post-image to data being accumulated for the extract process. Upon the commitment of the update, all extract processes for which data has been accumulated are started after making available the data accumulated for the process. In yet another embodiment, if the condition specified for the entity post-image is satisfied, the trigger executes a trigger query against the updated entity instance to dynamically generate a list of triggers which are then executed.

19 Claims, 5 Drawing Sheets

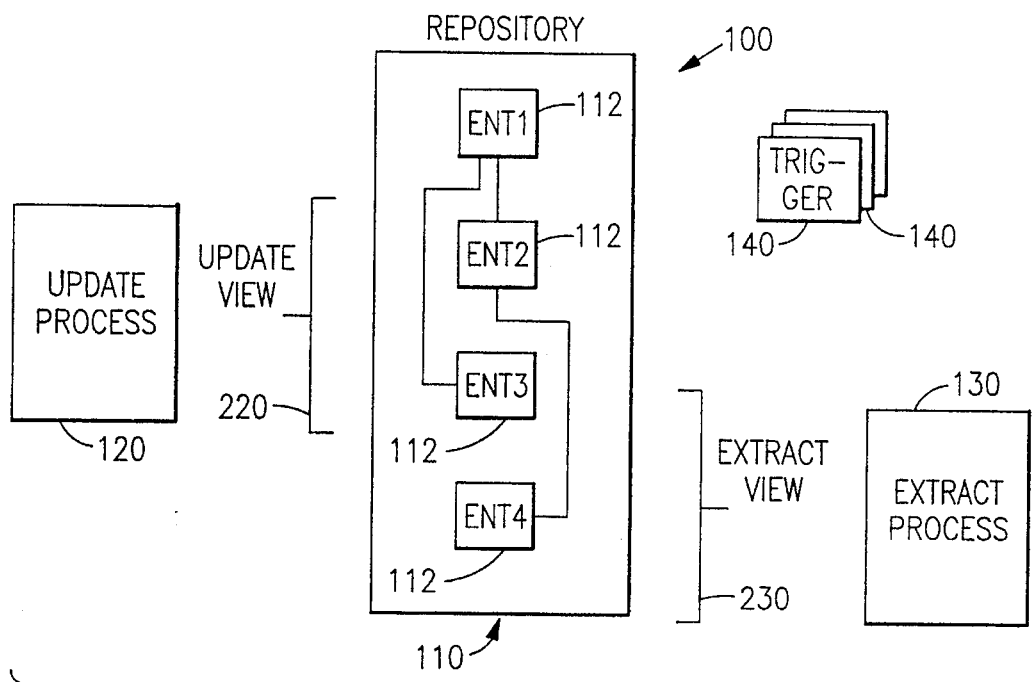
FIG.1
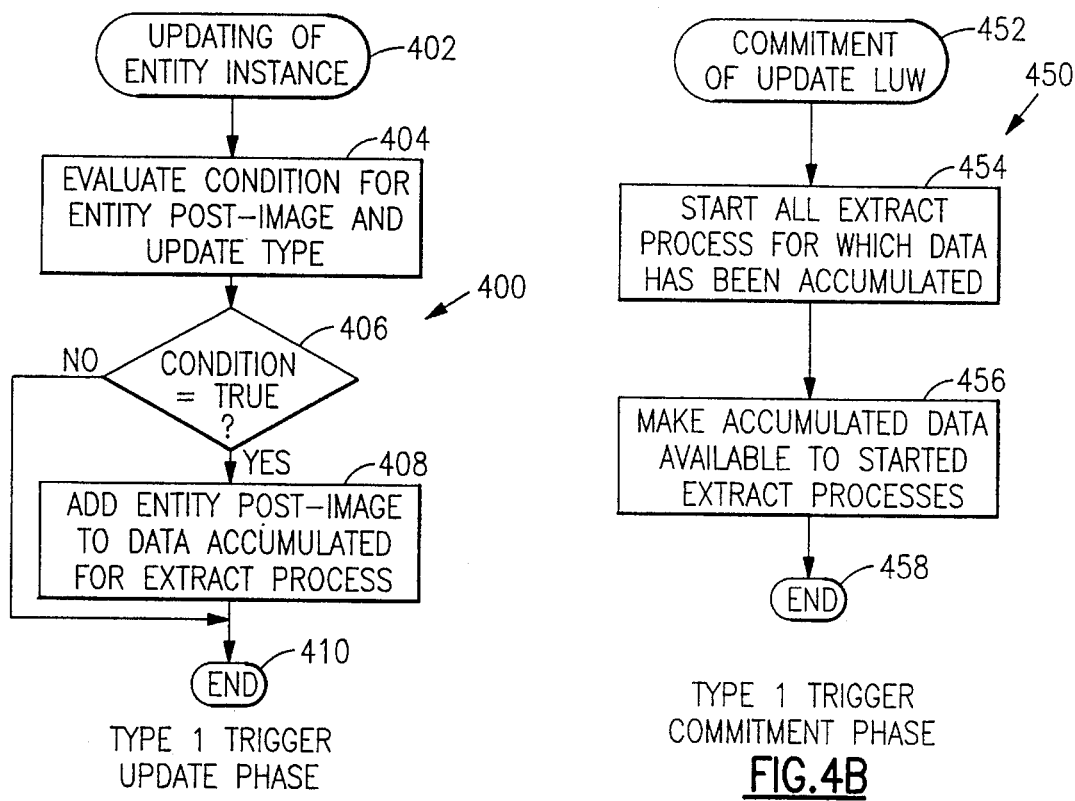
TYPE 1 TRIGGER
UPDATE PHASE
FIG.4A
TYPE 1 TRIGGER
COMMITMENT PHASE
FIG.4B

EMPLOYEE 112

| EMP NO | EMP NAME | DEPT | SALARY |
|---|---|---|---|
| 1346 | READE | ACCOUNTING | 50000 |
| 2877 | MILLER | ACCOUNTING | 45000 |
| 1013 | STONE | SALES | 50000 |
| 3914 | SMITH | SALES | 55000 |
| 5502 | JONES | SALES | 40000 |
| 7982 | JOHNSON | SALES | 42000 |
| 1927 | WHITE | SHIPPING | 28000 |
| 3051 | HOPPER | SHIPPING | 30000 |
| 4382 | SINCLAIR | SHIPPING | 25000 |
| 7863 | ELIOT | SHIPPING | 30000 |

220 — UPDATE VIEW (rows 3–6)
230 — EXTRACT VIEW

UEP TRIGGER

TRIGGER GENERATION IN AN ACTIVE DATABASE MANAGEMENT SYSTEM

BACKGROUND OF THE INVENTION

1. Field of the Invention

This invention relates to a trigger in an active database management system and, more particularly, to a trigger for automatically starting an extract process in response to the updating of a data repository by an update process.

2. Description of the Related Art

Conventional database management systems are "passive" in the sense that they only manipulate data in response to explicit requests from applications. Recently, so-called "active" database management systems have been developed that respond automatically to specified events without active user intervention. The operation of such active database management systems may be specified in the form of event-condition-action (ECA) rules, so called because upon the occurrence of a specified event, a specified condition is evaluated and, if the condition is satisfied, the specified action is executed. Active database management systems and ECA rules are discussed in such references as the following (incorporated by reference herein):

D. R. McCarthy and U. Dayal, "The Architecture of an Active Data Base Management System", *SIGMOD Record*, vol. 18, no. 2, June 1989, pp. 215–224.

U. Dayal, M. Hsu and R. Ladin, "Organizing Long-Running Activities with Triggers and Transactions", *SIGMOD Record*, vol. 19, no. 2, June 1990, pp. 204–214.

O. Diaz, N. Paton and P. Gray, "Rule Management in Object Oriented Databases: A Uniform Approach", *Proceedings of the 17th International Conference on Very Large Data Bases*, Barcelona, Sept. 1991, pp. 317–326.

N. Gehani and H. V. Jagadish, "Ode as an Active Database: Constraints and Triggers", *Proceedings of the 17th International Conference on Very Large Data Bases*, Barcelona, Sept. 1991, pp. 327–336.

A large number of applications can be structured as a set of processes that update data in a database (update processes) and another set of processes that require the updated data as input (extract processes). ECA rules (or triggers, as they are commonly called) may be integrated into such systems to automate the starting of the extract processes. To be truly useful in such applications, ECA rule languages should achieve several objectives. They should move data collection programming as much as possible out of the extract processes and into the triggers. They should also allow for the coding of data extraction programs independently from programs updating a repository. Needless to say, they should perform efficiently.

SUMMARY OF THE INVENTION

In accordance with the present invention, event-condition-action (ECA) rules are described that are particularly suited for use in applications where certain processes update data in the database that is required as input to other processes. Such applications will be referred to as update extract propagation (UEP) applications. Use of these rules will automatically start extract processes in response to updates done by an update process, and will eliminate the need for programming of the data collection in the extract processes. Key features of the invention are the independence of update and extract view and dynamic binding of the extract process.

More particularly, one aspect of the present invention contemplates a repository-level trigger for automatically starting an extract process in response to the committing of update data to a repository by an update process. The trigger comprises a program that is associated with a particular extract process and is started in response to the committing of update data to the repository by an update process. Upon being started, the trigger first determines whether any of the update data is within the extract view of the extract process with which the trigger is associated. If at least some of the update data is within the extract view, the trigger then evaluates a predetermined condition specified for the trigger. If the condition is satisfied, the trigger translates the update data within the extract view into the extract view, starts the extract process, and makes the data available to the extract process so that the latter may extract from the repository data added by the update process that is within the extract view.

In accordance with another aspect of the invention, the repository-level trigger is reformulated using a more specific form of triggers, namely entity-level triggers. To define a single repository-level trigger, a set of entity-level triggers are defined. The implementation using entity-level triggers solves several problems that would occur when directly trying to implement the trigger.

More particularly, this aspect of the present invention contemplates for each extract process a set of entity-level triggers (referred to as type 1 triggers herein), one for each entity in the repository within the extract view of thee extract process, so that each type 1 trigger is associated with both an extract process and an entity. A type 1 trigger is started in response to the updating of the entity with which it is associated. Upon being started, the type 1 trigger evaluates a predetermined condition specified for the trigger as a function of the entity post-image (i.e., the entity after it has been updated) and the update type. If the condition is satisfied, the type 1 trigger adds the entity post-image to, the data accumulated for the extract process in a buffer that is kept with the update process from which the entity updates are being done. If the LUW of the update process is committed, all extract processes for which data has been accumulated are started after making available the data accumulated for the process.

Yet another aspect of the present invention contemplates a set of entity-level triggers (referred to as type 2 triggers herein), each of which is associated with a different entity. As was the case with the type 1 triggers described above, a type 2 trigger, upon being started in response to the updating of the entity with which it is associated, evaluates a predetermined condition specified for the trigger as a function of the entity post-image and the update type. If the condition is satisfied, the type 2 trigger, rather than starting an extract process, executes a named trigger query using the values of the updated entity as substitution parameters to generate a list of type 1 triggers, which are then executed as described above.

BRIEF DESCRIPTION OF THE DRAWINGS

FIG. 1 is a schematic block diagram of an active database management system (DBMS) incorporating the present invention.

FIG. 4A is a flowchart of the operation of a first type of entity-level trigger of the present invention during the update phase.

FIG. 4B is a flowchart of the operation of the first type of entity-level trigger during the commitment phase.

DESCRIPTION OF THE PREFERRED EMBODIMENTS

Introduction

Figures 2A, 2B:
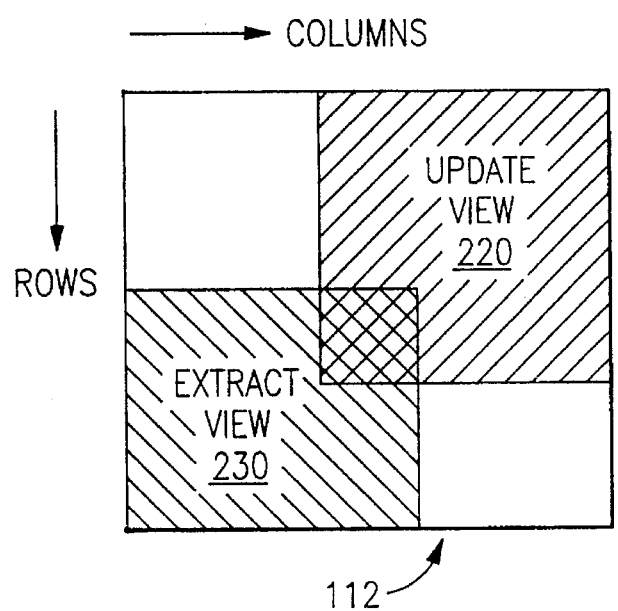
FIG. 2A shows a typical table in the repository of the system of FIG. 1, with update and extract views of data in the table.
FIG. 2B illustrates more generally the relationships between the update and extract views of an entity.

FIG. 1 shows the structure of an update extract propagation (UEP) database application 100 supported by the UEP language described below. Database application 100 operates upon data contained in one or more entities 112 (ENT1–ENT4) in a repository 110. Each of entities 112 in repository 100 represents a set of distinguishable objects of some particular type, such as employees, departments, suppliers, parts, shipments or the like. Database application 100 contains one or more update processes 120 (one of which is shown) updating the repository 110 and one or more extract processes 130 (one of which is shown) extracting from the repository data added by the update processes 120. Database application 100 also contains one or more triggers 140 that are the subject of the present invention and which respond to specified events associated with an update process 120. Repository 110 and database application 100 typically reside in permanent storage on one or more disks of the computer system (not shown) on which the database application is run, with portions of the repository and database application being transferred between permanent storage and main memory of the computer system as necessary for execution of the database application.

FIG. 2A shows the logical structure of a particular entity 112, which typifies the structure of the other entities 112 in the repository 110 as well. In the example shown, entity 112 has the entity name EMPLOYEE and has the form of a table or relation that is the fundamental structural unit of a relational database management system (RDBMS). Relational database systems are well known in the art, being described in such works as C. J. Date, *An Introduction to Database Systems*, vol. I, 4th ed., 1986, incorporated herein by reference.

As shown in FIG. 2A, the EMPLOYEE entity 112 contains one or more rows (also referred to as records or tuples) corresponding to particular employees (i.e., instances of the entity), as well as one or more columns (also referred to as fields or attributes) corresponding to particular attributes of an employee that are stored in the table. In the table shown in FIG. 2A, the particular attributes stored are employee number (EMPNO), employee name (EMPNAME), employee department (DEPT) and salary (SALARY).

Each update process 120 or extract process 130 operates on entities 112 in repository 110 through a view of the repository data that is specific to the process. As described in Chapter 8 (pp. 173–187) of the previously cited work of C. J. Date, a view is a named table that is derived from one or more underlying tables, typically by restricting the view table to a row or column subset of the underlying tables. Thus, considering the EMPLOYEE table 112 of FIG. 2A, an update process 120 may have an update view 220 of the table that is restricted to records whose DEPT field has a particular value (e.g., SALES); that is, the update process 120 may only update records for the SALES department. Similarly, an extract process 130 may have an extract view 230 of the table 112 that is limited to specified fields (e.g., EMPNAME and DEPT), and may not access other fields such as EMPNO and SALARY.

The update view 220 and extract view 230 shown in FIG. 2A are only exemplary views. Thus, update view 220 may alternatively or additionally be limited to a column subset of one or more underlying tables, while extract view 230 may alternatively or additionally be limited to a row subset of one or more underlying tables in repository 110. FIG. 2B depicts more generally the relation between an update view 20 and an extract view of a single entity 112. Although the two views 220 and 230 overlap in FIG. 2B, with the area of intersection being shown as cross-hatching, this need not be the case, and the intersection of a particular update view 220 and extract view 230 may be a null set.

An update process 120 operates in two stages. First, the update process 120 makes tentative updates to one or more entities in the repository 110; for example, an update process may update 5 rows in ENT1, 20 rows in ENT2, and so on. After making these tentative updates, the update process 120 either commits the updates to the repository 110 or rolls back (i.e., aborts) the updates, in which case the repository returns to its previous state.

UEP database applications are data dominated in the sense that whether an extract process 130 needs to be started is determined by what data elements in the repository 110 change. Optimally an extract process 130 should only be started if data changes within the extract view 230 of that process.

Several types of triggers 140 in accordance with the present invention are described below. The first of these is a repository-level trigger that is associated with, or bound to, a particular extract process 130 and is started whenever an update process 120 commits an update to the repository 110. The other two triggers are entity-level triggers that are also associated with specific extract processes, but are only started in response to the updating of a particular specific entity.

Repository-Level Trigger

As noted above, the repository-level trigger is associated with a particular extract process 130 and is started whenever an update process 120 commits an update to the repository 110. The syntax of the repository-level trigger is as follows:

ON EVENT (commit (LUW (update)))

CONDITION (cond (Extract view (update data), update_type, repository)=TRUE)

ACTION (Extract process (Extract View (update data), update_type, repository))

The specified event in this trigger is the committing of any sequence of updates to the source repository 110 contained within a single logical unit of work (LUW) from an update process 120. In accordance with ECA semantics, the event is what triggers the rule logic (in the form of a software routine) that evaluates the condition specified in the rule and, if the condition evaluates as true, takes the specified action. The particular mechanism for invoking the rule routine in response to the occurrence of the specified event does not form part of the present invention. Any suitable mechanism such as an interrupt mechanism may be used.

The condition is a piece of programming logic within the rule routine that evaluates a constraint. The program evaluating the constraint accesses the following input data:

| | |
|---|---|
| Extract view (update data) | those data elements contained in the update LUW that are within the extract view 230; |
| update_type | the action(s) through which these data elements are applied to the repository 110 (add, delete, update); |
| repository | data within the repository 110. |

Conditions typically evaluated might consist of one or more of the following:

1. Were any data elements (i.e., table rows) within the extract view 230 added by the update?
2. Were any data elements within the extract view deleted by the update?
3. Were any existing data elements within the extract view modified by the update?
4. Were particular attributes within the extract view (e.g., DEPT in FIG. 2A) modified by the update?

Still other conditions that are a function of the update data, update type and existing repository data are possible; the above list is only exemplary. The particular conditions evaluated would depend on the nature of the extract process 130. Thus, an extract process 130 that reported added entity instances (i.e., table rows) would determine whether any data elements were added, an extract process that reported modified entity instances would determine whether any data elements were modified, and so on.

After the event, if the condition is satisfied, the action starts the named extract process 130 and makes available to this process the input data listed above.

Figure 3A:
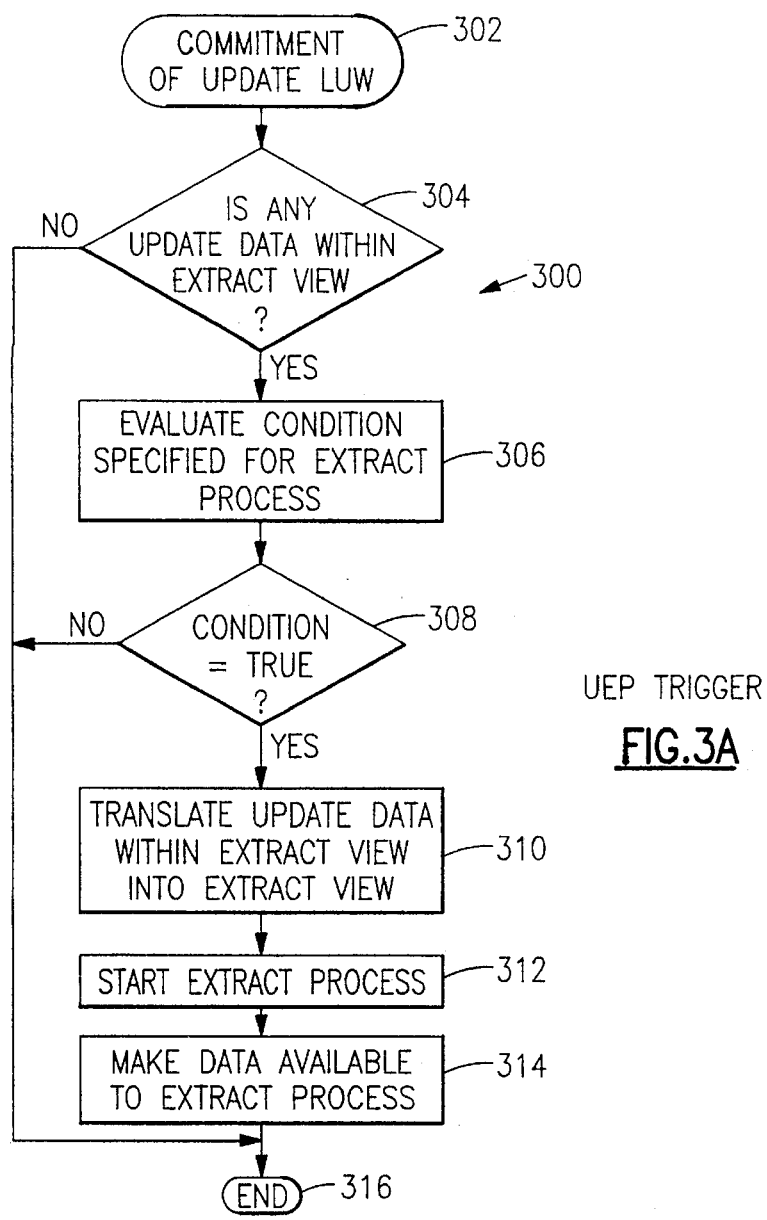
FIG. 3A is a flowchart of the operation of a repository-level trigger of the present invention.
Figure 3B:
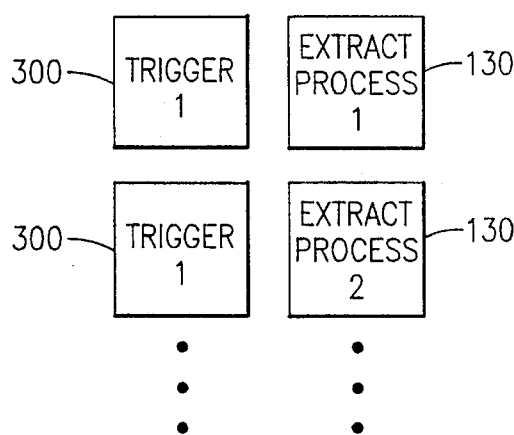
FIG. 3B is a schematic block diagram showing the relationship between the repository-level triggers of FIG. 3A and the extract processes with which they are associated.

FIG. 3A shows the steps performed by a program implementing a repository-level trigger 300. In general, and referring to FIG. 3B, each extract process 130 has a trigger 300 associated with it that is started in response to the committing of an update LUW to the repository 110 by an update process 120. If there are multiple extract processes 130, a corresponding number of repository-level triggers 300 are started.

Upon being started (step 302), each defined repository-level trigger 300 first verifies whether any of the update data is within the extract view 230 of the corresponding extract process 130 (step 304). If none of the update data is within the corresponding extract view 230, the program 300 terminates (step 316). Otherwise, the program 300 evaluates the condition specified for the trigger to see if the extract process 130 actually needs to be started (step 306). If the condition evaluates as false (step 308), the program 300 terminates (step 316). Otherwise, the program 300 translates the update data within the extract view 230 into the extract view (step 310), starts the extract process 130 (step 312), and makes the data available to the extract process (step 314) before terminating (step 316).

There are several key advantages to implementing an update propagation process using a trigger of the type described. First, data collection is pushed out of the application program into the triggers. This eliminates the programming that is normally required for data collection. Second, data is made available in terms of the extract view 230. This allows one to define the extract process independently from the update process 120. The advantage will be obvious in the case where one needs to write a considerable number of applications that both update and read from the repository 110.

Entity-Level Triggers

Introduction

Several problems may arise with the repository-level trigger 300 described above. First, if the extract view 230 and update view 220 do not normally overlap or only to a small extent, then propagation of updated data to the extract process is relatively inefficient; each trigger 300 is invoked, but most of them are not affected by the update therefore terminate at step 304. Second, if the condition specified only selects a small subset of the instances updated by a LUW, then propagation is relatively inefficient in this situation as well. The trigger 300 is invoked, but in most cases the condition is not satisfied and the trigger is therefore terminated at step 308. Third, if the database supports complex views on the repository 110, then intense computations may be required to transform the data added into data extracted at step 310.

Below are described two trigger implementations that minimize these difficulties. These implementations contemplate that an extract process be defined through a set of entity-level triggers instead of through a single repository-level trigger. Each entity-level trigger contributes to the extract process a selection of the total data from the update LUW that is within the extract view 230 of the extract process 130. In the first implementation, entity-level triggers referred to herein as type 1 triggers are statically bound to (i.e., associated with) entities 112 within the extract view 230 of a process. Type 1 triggers accumulate entity update data during the update phase of an update operation for passing to the extract process during the commitment phase. In the second implementation, entity-level triggers referred to herein as type 2 triggers are also bound to entities 112. However, rather than directly interacting with extract processes 130, type 2 triggers generate lists of type 1 triggers, which are then executed as described above.

First Implementation: Type 1 Trigger

A type 1 entity-level trigger takes the following form:

Type_1 trigger:

| | |
|---|---|
| 01 ON EVENT | (entity update (entity_name)) |
| 02 CONDITION | (cond (entity post-image, update_type) = TRUE) |
| 03 ACTION | (Avail (Extract View (entity post-image), update_type, UEP buffer)) |
| 04 ON EVENT | (commit (LUW update)) |
| 05 ACTION | (UEP buffer, All Extract process( All (Avail(Extract View (entity post-image), update_type)))) |

The event (line 01) is an update to an instance of the entity 112 specified, done from within the update process LUW. The condition (line 02) is a piece of programming logic that evaluates a constraint. The program evaluating the constraint has access to the following input data:

| | |
|---|---|
| entity post-image | the post-image of the updated entity instance; and |
| update_type | the type of entity update (add, delete, update). |

As with the repository-level trigger 300, the type 1 entity-level trigger may evaluate a variety of condition types (depending on the nature of the associated extract process 130), including the following:

1. Was an entity instance (i.e., table row) added by the update?
2. Was an entity instance deleted by the update?
3. Was an entity instance modified by the update?
4. Was a particular attribute of an entity instance (e.g., DEPT in FIG. 2A) modified by the update?

The action (line 03) makes available in a buffer that is kept with the update process (UEP buffer):

| | |
|---|---|
| Extract View (entity post-image) | those attributes from the post-image of the updated entity instance which are within the extract view 230; per attribute, a field state indicator (FSI) indicating if the attribute was updated; and |
| update_type | the type of entity update (add, delete, update). |

The program implementing the type 1 trigger processes the trigger for each entity update done from an update LUW. When the update LUW is committed, a second implementing program scans the UEP buffer, and starts all named extract processes 130 that were mentioned in at least one type 1 trigger whose condition was found to be TRUE (line 04 above). For each extract process 130, the data contributed by each type 1 trigger for that process is made available (line 05). Although a type 1 trigger only makes available a single updated entity instance, the started extract process 130 receives the sum of all updated entity instances for which a type 1 trigger is defined. Through this combined effect, the type 1 entity-level trigger is capable of handling the same scope of data as the repository-level trigger discussed above.

FIG. 4A shows in flowchart form the steps performed during the update phase by a program 400 implementing a type 1 trigger. In general, each extract process 130 has a type 1 trigger 400 associated with it for each entity 112 in the repository 110 within the extract view of the process. Thus, if there are m extract processes 130 and n entities 112 in the repository 110, there may be as many as mn type 1 triggers, depending on the extract views 230 of the extract processes.

The type 1 trigger 400 is started in response to the updating of the corresponding entity 112 by an update process 120. More specifically, for each entity instance 112 being tentatively updated by an update process 120, database application 100 invokes a type 1 trigger 400 concurrently with the update for each extract process 130 that has a type 1 trigger defined for the updated entity 112. As noted above, the triggering event is the updating of an entity instance. Thus, if 20 rows of the same table are updated consecutively, the type 1 trigger is invoked 20 times.

Upon being started (step 402), each type 1 trigger 400 evaluates the condition specified for the trigger as a function of the entity post-image and the update type (step 404). If the condition is not satisfied (i.e., evaluates as false) (step 406), the program 400 terminates (step 316). Otherwise, the program 400 adds the post-image of the entity 112 to data accumulated for the extract process 130 in a buffer (not shown) before terminating (step 410).

Referring to FIG. 4B, upon the commitment of the tentative updates to the repository 110 by the update process 120 (step 452), database application 100 executes another implementing program 450 that starts all extract processes 130 for which data has been accumulated (step 454) and makes the accumulated data available to the started extract processes (by passing the data to the processes as input parameters) (step 456) before terminating (step 458). In contrast to the procedure 400 shown in FIG. 4A, which is executed for each tentative update of an entity 112, the procedure 450 is executed for the repository 110 as a whole upon the final commitment of an update LUW by an update process 120.

Type 1 entity-level trigger 400 overcomes the above-described problems associated with the repository-level trigger 300. As already noted, for each extract process 130 a type 1 trigger 400 is statically bound to each entity 112 within the extract view 230 of the process. Instead of evaluating for each update whether it contains data within the extract view 230 of a extract process 130, application 100 now defines in advance for each entity 112 (through entity-level triggers 400) which extract processes are affected.

An application 100 implementing a type 1 trigger 400 thus monitors the update flow at entity level, recording the extract processes 130 it needs to consider based on the presence of the entity-level triggers. This increases efficiency in case of a small overlap between update and extract views.

As is evident from the above statement of its syntax, type 1 trigger 400 makes available a selection of attributes to the extract process 130. This implies that the extract view 230 supported is the selection of attributes from entities (as shown for the EMPLOYEE 112 entity in FIG. 2A). By offering only limited complexity, no complex calculations are required.

Second Implementation: Type 2 Trigger

In this implementation, type 1 triggers 400 are not directly bound to entities 112, but are produced dynamically by queries contained in type 2 triggers that are themselves bound to entities.

A type 2 entity-level trigger takes the following form:
Type_2 trigger:

| | | |
|---|---|---|
| 11 | ON EVENT | (entity update (entity_name)) |
| 12 | CONDITION | (cond (entity post-image, update_type) = TRUE ) |
| 13 | ACTION 1 | (List of type_1 triggers = Execute Trigger_query (entity post-image, query)) |
| 14 | ACTION 2 | (Execute List of type_1 triggers) |

A type 2 trigger is associated with each entity 112 being updated. However, in contrast to the type 1 trigger 400 in the first implementation, each entity 112 generally has only one type 2 trigger, regardless of the number of update processes 130.

The event and condition parts (lines 11–12) of a type 2 trigger are similar to those (lines 01–02) of the type 1 trigger 400 in the first implementation described above. For type 2 triggers, however, the action is twofold. First, the named trigger query is executed using the values of the updated entity instance as substitution parameters (line 13). This query returns a list of type 1 triggers 400. Next, the returned list of type 1 triggers 400 is handled as if the listed type 1 triggers had been defined directly at entity level (line 14). Thus, whereas type 1 triggers make available data to an extract process 130, type 2 triggers produce type 1 triggers 400 that are evaluated in turn, creating one level of nesting.

Figure 5:
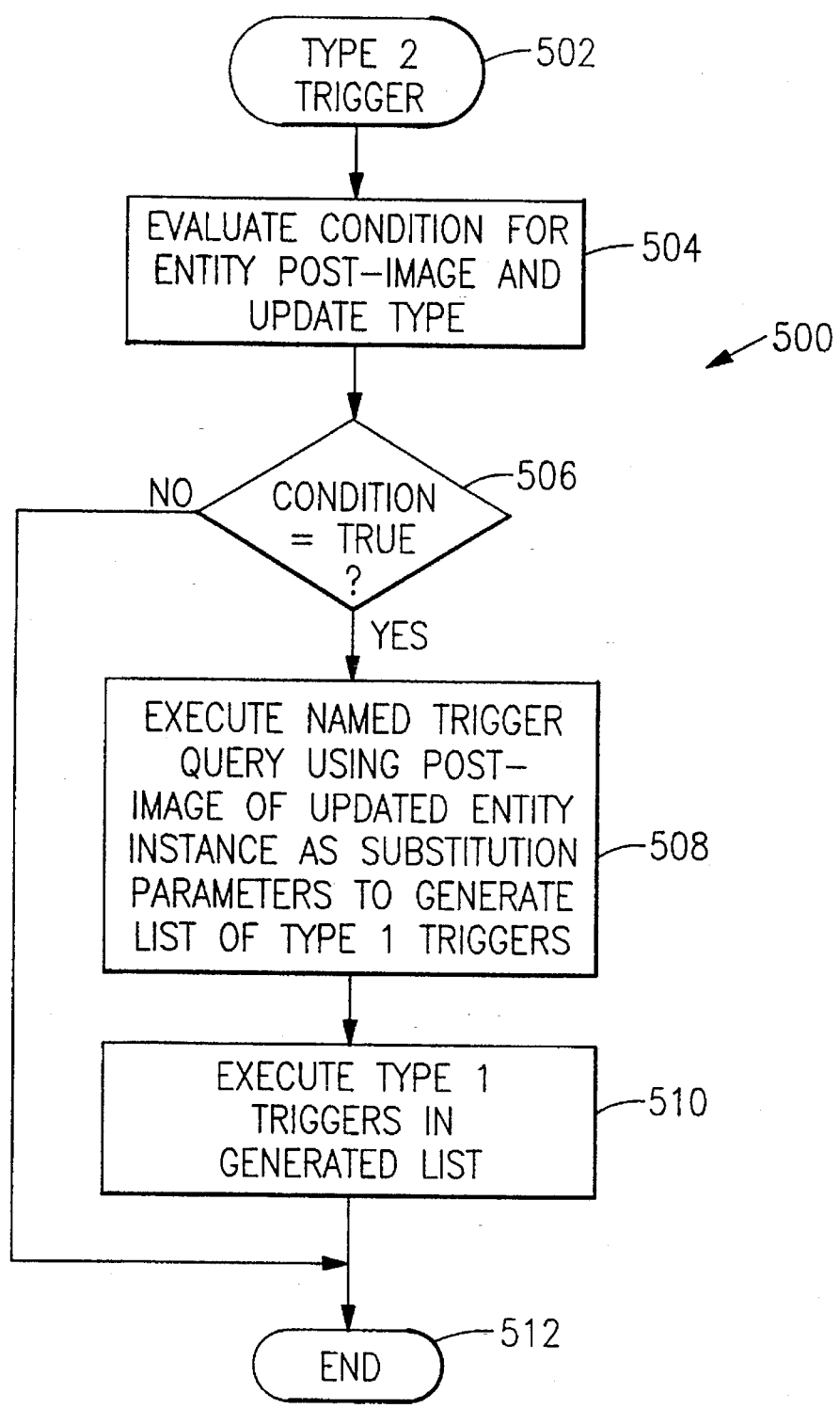
FIG. 5 is a flowchart of the operation of a second type of entity-level trigger of the present invention.

FIG. 5 shows in flowchart form the steps performed by a program 500 implementing a type 2 trigger. Steps 500–506 are identical to the corresponding steps 400–406 performed by the type 1 trigger 400 (FIG. 4). However, if the specified condition is satisfied (step 506), the type 2 trigger 500, instead of accumulating data for an extract process 130, executes a named trigger query using the values of the updated entity instance as substitution parameters to generate a list of type 1 triggers 400 (step 508). The type 2 trigger 500 then executes the type 1 triggers 400 in the generated list (step 510) before terminating (step 512).

Using a type 2 trigger 500 to derive a list of type 1 triggers 400 effectively pushes the evaluation of the condition that is part of a type 1 trigger into the query of the type 2 trigger. As the returned type 1 triggers 400 belong to the updated entity instance, this increases efficiency in those cases where the update propagation process only applies to a small subset of the instances updated by a LUW. Efficiency is increased, since only those type 1 triggers are returned that are relevant, and since the evaluation of the condition normally done on type 1 triggers is now done more effectively by the database manipulation language (DML) in the query.

Type 2 triggers 500 require that the extract process itself be modeled in the repository 110. For this purpose, an additional entity 112 in repository 110 is defined containing a list of type 1 triggers. By including foreign keys in this entity 112 into the data model, the type 2 trigger 500 through evaluation of the query may dynamically decide which of the type 1 triggers 400 is to be evaluated for a specific entity instance that is being updated.

Exemplary Application

Figure 6:
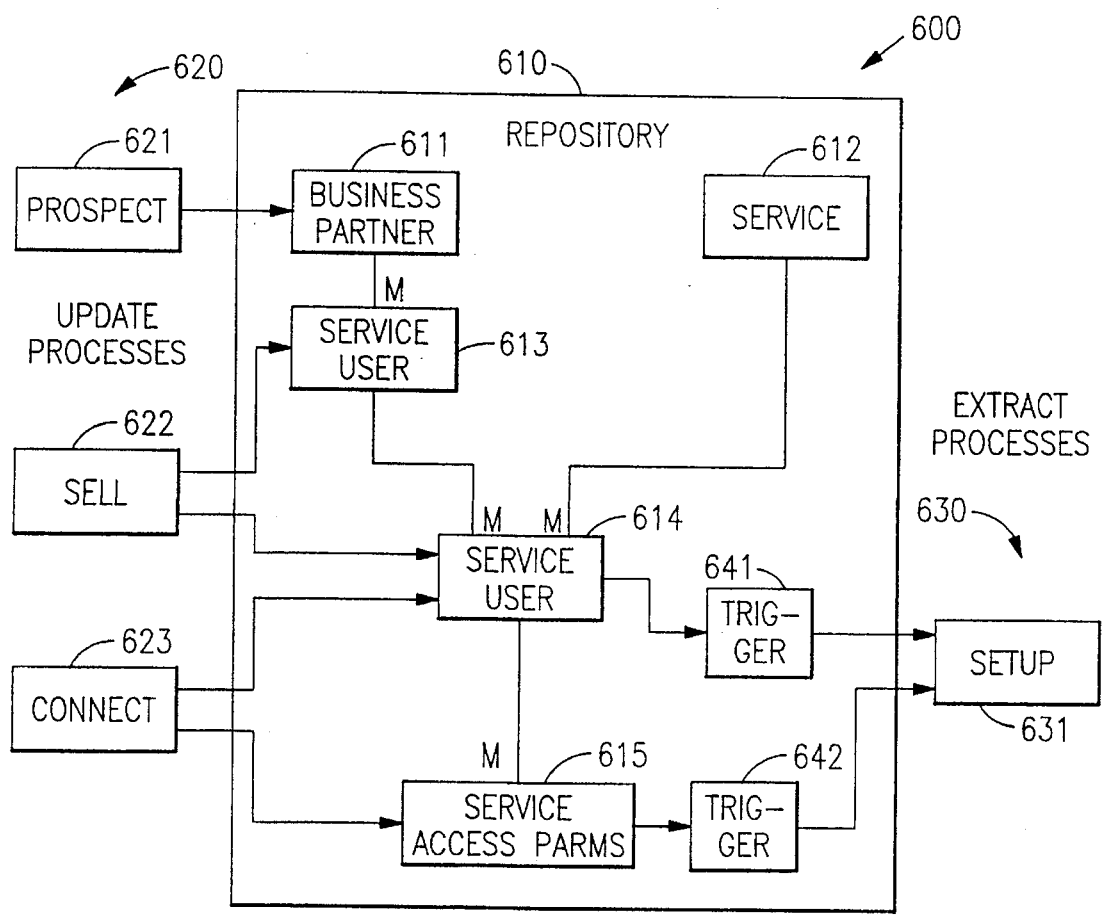
FIG. 6 is a schematic block diagram of a data model in which the triggers of FIGS. 4A and 4B are used.

As an example of an application in which the type 1 and type 2 triggers 400 and 500 may be used, consider the data model 600 depicted in FIG. 6. The model 600 represents the business of a company which is selling services. The entities in the model 600, contained in a repository 610, maintain information on:

1. The identity of the business partners the company is selling services to (BUSINESS PARTNER 611).

2. The type of services the company is selling (SERVICE 612).

3. For each business partner, the identity of its service users (SERVICE USER 613).

4. For each service user, the services he may access (SERVICE ACCESS 614).

5. For each access, details of the access (SERVICE ACCESS PARMS 615).

The example applies to a large range of business domains, from a company selling an electronic service like electronic data interchange (EDI) to a company leasing cars. The symbol M in FIG. 6 indicates whether a relationship attaches to multiple instances.

Information in the data model 600 may be processed by many update processes 620. Thus, a marketing representative may enter information about new prospects, using a PROSPECT application 621 that updates the BUSINESS PARTNER entity 611. Alternatively, a marketing representative may enter information about individual users of a business partner who will use a service, using a SELL application 622 that updates the SERVICE USER entity 613 and SERVICE ACCESS entity 614. A whole range of SELL applications 622 may be available to support various marketing strategies. As another alternative, a technical representative may enter details of the access using a CONNECT application 623 that updates the SERVICE ACCESS entity 614 and the SERVICE ACCESS PARMS entity 615. A whole range of CONNECT applications 623 may be available to support various service types.

An example of an extract process 630 may include a SET UP application 631, which is run by order delivery to implement the requested service. SET UP application 631 needs to be run each time the SERVICE ACCESS entity 614 or SERVICE ACCESS PARMS entity 615 is updated; which of update processes 622–623 performs the update is immaterial.

In accordance with the first entity-level trigger embodiment described above, starting the SET UP application 631 and making the required data available is done by associating type 1 triggers 641 and 642 with the SERVICE ACCESS entity 614 and SERVICE ACCESS PARMS entity 615, respectively. Trigger 641 is "fired" in response to an updating of SERVICE ACCESS entity 614 by an update process 622 or 623, while trigger 642 is "fired" in response to an updating of SERVICE ACCESS PARMS entity 615 by an update process.

Figure 6A:
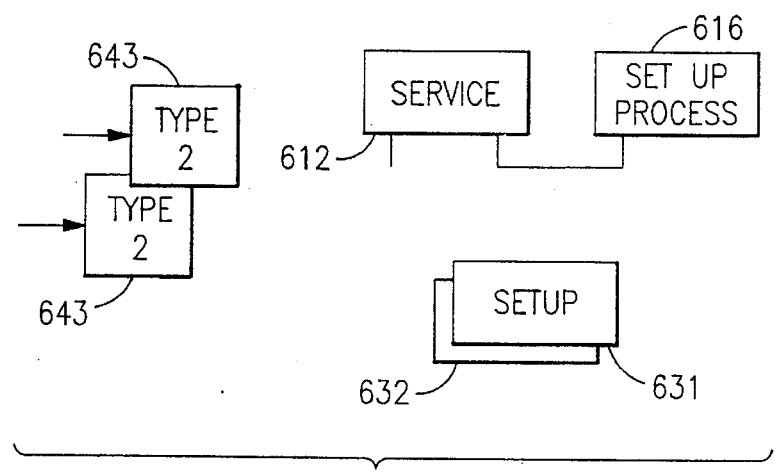
FIG. 6A is a schematic block diagram of a data model in which the trigger of FIG. 5 is used.

Referring now to FIG. 6A, one may have a situation where different applications (e.g., SET UP processes 631 and 632) need to be started based upon the type of service (as represented in the SERVICE entity 612). In this situation, one can associate respective type 2 triggers 643 with entities being updated and include an entity SET UP PROCESS 616 which is linked to the type of service. The type 2 trigger query uses this relationship to associate the appropriate SET UP process 631 or 632 with updates of the SERVICE ACCESS and SERVICE ACCESS PARMS entities 614 and 615.

Conclusion

The present invention makes it possible to move a considerable amount of data collection programming out of the application program into the triggers, and makes it possible to code data extraction programs independently from programs updating the repository. Finally, the present invention provides an efficient implementation of data collection based on triggers. Although particular implementations have been described, it will be apparent that other implementations within the scope of the appended claims are possible without departing from the spirit of the invention.

What is claimed is:

1. In an active database management system in which at least one update process updates an entity in a data repository to form a post-image of said entity and at least one extract process extracts from said repository data added by said update process, said update process having an update view of data in said repository, said extract process having an extract view of data in said repository, a method for automatically starting said extract process in response to the committing of update data to said repository by said update process, said method comprising the steps of:

(a) in response to the updating of an entity in said repository by said update process, evaluating a predetermined condition specified for said entity; and (b) in response to an evaluation of said predetermined condition as true, adding said post-image of said entity to data accumulated for said extract process; and (c) in response to the committing of update data to said repository by said update process, starting said extract process and making the accumulated data available to said extract process to extract from said repository data added by said update process that is within said extract view.

2. The method of claim 1 in which said predetermined condition is a function of said post-image of said entity.

3. The method of claim 1 in which said update process performs an update of a selected update type on said entity, said predetermined condition being a function of said update type.

4. The method of claim 1 in which said repository contains a plurality of entities, said steps (a)–(b) being performed for each of said entities within the extract view of said extract process.

5. The method of claim 4 in which a plurality of extract processes extract data from said repository, said steps (a)–(b) being performed for each of said extract processes for each of said entities within the extract view of the extract process.

6. The method of claim 5 in which said step (c) comprises the steps of:

(1) starting all extract processes for which data has been accumulated; and (2) making the accumulated data available to the started extract processes.

7. In an active database management system in which at least one update process updates one or more entities in a data repository to form a post-image of said entities and at least one extract process extracts from said repository data added by said update process, said update process having an update view of data in said repository, said extract process having an extract view of data in said repository, a method for automatically starting said extract process in response to the committing of update data to said repository by said update process, said method comprising the steps of:

(a) in response to the updating of a specified entity in said repository by said update process, evaluating a predetermined condition specified for said entity; and (b) in response to an evaluation of said predetermined condition as true, executing a specified trigger query on said post-image of said entity to generate a list of one or more triggers; and (c) executing the one or more triggers contained in said list.

8. The method of claim 7 in which first and second extract processes are defined, said list containing respective first and second triggers associated with said first and second extract processes.

9. In an active database management system in which at least one update process updates an entity in a data repository to form a post-image of said entity and at least one extract process extracts from said repository data added by said update process, said update process having an update view of data in said repository, said extract process having an extract view of data in said repository, apparatus for automatically starting said extract process in response to the committing of update data to said repository by said update process, said apparatus comprising:

(a) means responsive to the updating of an entity in said repository by said update process for evaluating a predetermined condition specified for said entity; and (b) means responsive to an evaluation of said predetermined condition as true for adding said post-image of said entity to data accumulated for said extract process; and (c) means responsive to the committing of update data to said repository by said update process for starting said extract process and making the accumulated data available to said extract process to extract from said repository data added by said update process that is within said extract view.

10. The apparatus of claim 9 in which said repository contains a plurality of entities, said apparatus containing said means (a)–(b) for each of said entities within the extract view of said extract process.

11. In an active database management system in which at least one update process updates one or more entities in a data repository to form a post-image of said entities and at least one extract process extracts from said repository data added by said update process, said update process having an update view of data in said repository, said extract process having an extract view of data in said repository, apparatus for automatically starting said extract process in response to the committing of update data to said repository by said update process, said apparatus comprising:

(a) means responsive to the updating of a specified entity in said repository by said update process for evaluating a predetermined condition specified for said entity;

(b) means responsive to an evaluation of said predetermined condition as true for executing a specified trigger query on said post-image of said entity to generate a list of one or more triggers; and (c) means for executing the one or more triggers contained in said list.

12. A program storage device readable by a machine, tangibly embodying a program of instructions executable by the machine to perform method steps for automatically starting an extract process in response to the committing of update data to a repository by an update process in an active database management system in which at least one update process updates an entity in a data repository to form a post-image of said entity and at least one extract process extracts from said repository data added by said update process, said update process having an update view of data in said repository, said extract process having an extract view of data in said repository, said method steps comprising:

(a) in response to the updating of an entity in said repository by said update process, evaluating a predetermined condition specified for said entity; and (b) in response to an evaluation of said predetermined condition as true, adding said post-image of said entity to data accumulated for said extract process; and (c) in response to the committing of update data to said repository by said update process, starting said extract process and making the accumulated data available to said extract process to extract from said repository data added by said update process that is within said extract view.

13. The program storage device of claim 12 in which said predetermined condition is a function of said post-image of said entity.

14. The program storage device of claim 12 in which said update process performs an update of a selected update type on said entity, said predetermined condition being a function of said update type.

15. The program storage device of claim 12 in which said repository contains a plurality of entities, said steps (a)–(b) being performed for each of said entities within the extract view of said extract process.

16. The program storage device of claim 15 in which a plurality of extract processes extract data from said repository, said steps (a)–(b) being performed for each of said extract processes for each of said entities within the extract view of the extract process.

17. The program storage of claim 16 in which said step (c) comprises the steps of:

(1) starting all extract processes for which data has been accumulated; and (2) making the accumulated data available to the started extract processes.

18. A program storage device readable by a machine, tangibly embodying a program of instructions executable by the machine to perform method steps for automatically starting an extract process in response to the committing of update data to a repository by an update process in an active database management system in which at least one update process updates one or more entities in a data repository to form a post-image of said entities and at least one extract process extracts from said repository data added by said update process, said update process having an update view of data in said repository, said extract process having an extract view of data in said repository, said method steps comprising:

(a) in response to the updating of a specified entity in said repository by said update process, evaluating a predetermined condition specified for said entity; and (b) in response to an evaluation of said predetermined condition as true, executing a specified trigger query on said post-image of said entity to generate a list of one or more triggers; and (c) executing the one or more triggers contained in said list.

19. The method of claim 18 in which first and second extract processes are defined, said list containing respective first and second triggers associated with said first and second extract processes.

* * * * *